United States Patent [19]
Nishio et al.

[11] 3,912,605

[45] Oct. 14, 1975

[54] RADIATION CROSSLINKED VINYL CHLORIDE RESIN

[75] Inventors: Keizi Nishio; Takashi Sasaki; Kunio Araki, all of Takasaki; Masatoshi Fukushima, Fuchu, all of Japan

[73] Assignee: Japan Atomic Energy Research Institute, Tokyo, Japan

[22] Filed: Oct. 18, 1974

[21] Appl. No.: 515,852

Related U.S. Application Data

[63] Continuation of Ser. No. 275,052, July 25, 1972, abandoned.

[30] Foreign Application Priority Data

July 26, 1971  Japan.............................. 46-55220

[52] U.S. Cl. . 204/159.14; 204/159.16; 204/159.19; 260/836; 260/837 R; 260/879; 260/890
[51] Int. Cl.² ......................... C08F 8/00; C08F 2/46
[58] Field of Search..... 204/159.14, 159.16, 159.19; 260/836, 837 R, 890, 879

[56] References Cited

UNITED STATES PATENTS

| | | | |
|---|---|---|---|
| 2,842,513 | 7/1958 | Fitzgerald et al. | 260/836 |
| 3,278,477 | 10/1966 | Evans | 260/836 |
| 3,377,406 | 4/1968 | Newey et al. | 260/836 |
| 3,535,403 | 10/1970 | Holob et al. | 260/836 |

*Primary Examiner*—Richard B. Turer
*Attorney, Agent, or Firm*—Stevens, Davis, Miller & Mosher

[57] ABSTRACT

A blended composition comprising a vinyl chloride resin and a specific epoxy compound derived from a conjugateddiene homopolymer and/or copolymer can advantageously be crosslinked by means of an ionizing radiation. Said epoxy compound is bonded with an ethylenically unsaturated organic acid having a double bond adjacent the carboxyl group to a part of the epoxy group of the epoxy compound.

6 Claims, No Drawings

RADIATION CROSSLINKED VINYL CHLORIDE RESIN

This is a continuation of application Ser. No. 275,052, filed July 25, 1972, now abandoned.

BACKGROUND OF THE INVENTION

This invention is directed to an improved method of crosslinking a vinyl chloride resin composition by means of an ionizing radiation and its product. Said vinyl chloride resin composition comprises a blend of vinyl chloride resin with a specific compound derived from a conjugated-diene polymer.

It has been known that the irradiation of polyvinyl chloride with an ionizing radiation generally results in crosslinking reaction in its molecules and in improvement of the mechanical properties and of the thermal resistance. However, the rate of crosslinking reaction in the polyvinyl chloride is slow if carried out with only the irradiation of an ionizing radiation. If a large dose of irradiation is used with the aim of getting a large degree of crosslinking, it causes degradation or deterioration due to dehydrochlorination reaction and the like in the molecules. Therefore, polyvinyl chloride with the desired degree of crosslinking can not be obtained. As an improved method for the purpose, there is a well known technique in which the irradiation is carried out after blending of polyvinyl chloride with a compound having epoxy-ring in its molecule (for instance, Japanese Pat. Publication, No. 29019/1965) and in another well known technique a chloride accelerator is further added to the blended composition before irradiation (for instance, Japanese Pat. Publication, No. 8739/1969).

SUMMARY OF THE INVENTION

This invention relates to an improved method of crosslinking a vinyl chloride resin composition by means of an ionizing radiation and a crosslinked vinyl chloride resin composition. Particularly, its method relates to a method of crosslinking a blended composition comprising a vinyl chloride resin and a specific compound derived from a conjugated-diene polymer.

The vinyl chloride resins include polyvinyl chlorides or vinyl chloride copolymers comprising more than 50% by weight of vinyl chloride and not more than 50% of at least one species of copolymerizable ethylenically unsaturated monomer, for instance, vinyl acetate, vinyl ether, ethylene, propylene or the like. Polymerization degree of the vinyl chloride resin generally ranges from about 200 to about 5,000 and preferably from about 400 to about 3,000.

The present inventors investigated to find the most effective technique for crosslinking molecules of vinyl chloride resin by the irradiation of an ionizing radiation, and they found that the double bond adjacent to a carbonyl group in the molecule has high sensitivity to an ionizing radiation. The present invention has been accomplished on the basis of the finding that the crosslinking reaction takes place with an unexpectedly low dose of the radiation and that a crosslinked vinyl chloride resin having excellent properties is obtained, when one employs a compound which is prepared by adding an ethylenically unsaturated organic acid having a double bond adjacent its carboxyl group to a part of epoxy group in the epoxy compound derived from a conjugated-diene homopolymer or copolymer. Moreover, in the present invention, the residual epoxy group acts as an internal stabilizer for irradiation or pyrolysis of vinyl chloride resin and contributes to give a good crosslinked polyvinyl chloride resin.

The kinds of conjugated diene-homopolymer or -copolymer to be employed as a raw material for the production of the compound of the present invention include aliphatic conjugated diene-homopolymer, random- or block-copolymer comprising two or more aliphatic conjugated dienes, random- or block-copolymer in which a monomer of more than 50 weight % of the monomers constituting the copolymers is one or more aliphatic conjugated diene and another comonomer is selected from vinyl compounds, and a mixture of these polymers.

The aliphatic conjugated diene in the present invention includes 1,3-butadiene, isoprene, 1,3-pentadiene, chloroprene and the like, and the aromatic vinyl compound includes styrene, α-methylstyrene, p-methylstyrene, p-ethylstyrene, p-methoxystyrene, chlorostyrene and the like. Acrylonitrile, methacrylonitrile or the like can be used as a copolymerizable monomer in the present invention.

Conjugated diene-homopolymer or -copolymer having more than two polymerized chains and number average molecular weight up to about 10,000, is usually used for the present purpose, and one having a molecular weight within the range of from about 300 to about 6,000 is preferable. The reason for limiting the range of the number average molecular weight is that the polymerized chain in which a large amount of aromatic comonomer such as styrene is contained results in a poor fluidity and leads to a polymer of no practical use due to the reduction of its working capability, and therefore, for instance, it is necessary that at least more than 50 weight % of the constituents of the polymerized chain be aliphatic conjugated diene, in order to produce liquid epoxy compound at room temperature; on the other hand, an excessively large number average molecular weight of the polymer increases its viscosity and the working capability is reduced. However, the molecular weight is not so restricted if the resin has good miscibility to vinyl chloride resins.

DESCRIPTION OF THE PREFERRED EMBODIMENTS

The conjugated diene-homopolymer or -copolymer, which is used as a raw material in the present invention, is produced in the following way. A conjugated diene, two or more conjugated dienes or a conjugated diene and other comonomer are polymerized to form the above mentioned polymer by means of a well known anion polymerization technique, using one of each of the following polymerization initiators and solvents. The initiator includes alkali metals such as lithium, sodium, potassium, rubidium, cesium or the like; allyl- or alkyl-alkali metal compound such as n-butyl lithium, phenyl lithium, benzil sodium, cumil potassium, cyclopentadienyl sodium, sodium naphthalene; dialkali metal added low molecular weight polymers of conjugated diene compound such as dimeric α-methyl styrene dipotassium, tetrameric α-methyl styrene disodium, dimeric butadiene disodium; alkali metal ketyl such as sodium added benzophenone; alkali metal added aromatic hydrocarbon such as lithium added naphthalene, sodium added anthracene, potassium added biphenyl; or the like. The solvent used for the present purpose includes hydrocarbons such as tetrahydrofuran, 1,2-dimethoxyethane, dimethyl ether, trimethyl amine, or a mixture of these materials.

The method of preparing the epoxy compound, which is used as raw material in the production of the compound used in the present invention, are described hereinafter. Addition of oxirane oxygen, to a part or all of double bonds in the polymerized chain of conjugated diene-homopolymer or -copolymer, is carried out by treating the above polymer using a well known epoxidizing agent. The epoxidizing agent includes organic peracids such as peracetic acid, perpropionic acid, perlauric acid, perbenzoic acid, phthalic monoperacid and the like, and organic hydroperoxides such as tert-butyl hydroperoxide, cumen hydroperoxide and the like. The epoxidation reaction is performed by adding the above epoxidizing agent, previously prepared into the above mentioned polymer or the solution in which the above mentioned polymer is dissolved into the solvent such as n-heptane, n-hexane, toluene and chloroform which does not react with epoxidizing agent; or by adding the above mentioned polymer or its solution to the solution in which the above mentioned epoxidizing agent is dissolved to the above mentioned solvent. Moreover, the epoxidizing reaction can also be carried out through the reaction, wherein an organic peracid is formed in the system, by adding hydrogen peroxide in the solution in which the above mentioned polymer is dissolved in an organic acid such as formic acid, acetic acid or the like, and, if necessary, in the above mentioned solvent, in the presence of an acid catalyst such as sulfuric acid, strong acid ion exchange resin; or through the reaction, wherein perbenzoic acid is formed, by the addition of benzaldehyde to the above mentioned polymer solution followed by the bubbling of oxygen gas under the irradiation of an ultraviolet rays. The quantity of the epoxidizing agent to be added depends on its species and the conditions of the epoxidation reaction; however, in most cases it is necessary to use a larger amount of the epoxidizing reaction than the calculated value to get the desired content of oxirane oxygen. The temperature for the epoxidation reaction depends on the species of epoxidizing agent and of catalyst, and the reaction is generally carried out at about 0° – 95°C, preferably 40° – 70°C, for the use of organic peracids, and at about 70° – 150°C, preferably 90° – 140°C, for the use of organic hydroperoxides. The reaction time depends on the reaction temperature and on the content of oxirane oxygen and is usually completed within several hours. After the epoxidizing reaction is completed, the desired epoxy compound is obtained by removal of catalyst, solvent and solute having low boiling point by means of flushing with water, filtration and distillation under reduced pressure.

The compound used in the present invention is obtained by the reaction of the epoxy group, in the above mentioned polymer, with the carboxyl group in an unsaturated organic acid in either the presence or absence of a reasonable catalyst or a solvent. The main reasons, in the present invention, for the addition of an unsaturated organic acid to a part of the epoxy group, are that the double bonds adjacent the carbonyl group coming from the unsaturated organic acid have much higher susceptibility to radiation than the residual double bonds without epoxidizing and the residual epoxy group in the conjugated diene compound; and that the irradiated double bonds have the effects similar to reaction initiator.

Therefore, it is necessary that the unsaturated organic acid used in the present invention have the structure $CHX=CHY-COOH$ (where, X and Y mean hydrogen or halogen atom or a lower alkyl group, an alkoxy group or the like). Economically available unsaturated organic acids include acrylic acid and metacrylic acid. Moreover, in the present invention, the unsaturated organic acid is used with the quantity corresponding to about 0.1 – 0.9 mole of carboxyl group in the acid to 1 mole of epoxy group in the epoxy compound obtained from conjugated diene-homopolymer or -copolymer. While the addition reaction of the unsaturated organic acid to the above mentioned epoxy group proceeds in the absence of catalyst, hydrochloride of diamine such as diethyl amine hydrochloride, tert-amine such as triethyl amine and hydrochloride of tert-amines are usually used as catalyst. Any solvent can be used in the addition reaction if it does not react with epoxy or carbonyl group. The solvents include aromatic hydrocarbons such as benzene, toluene and xylene, ketones such as acetone and methylethyl ketone, esters such as ethyl acetate and n-butyl acetate, and the like. The reaction temperature depends on the solvent and on the catalyst, and the range from room temperature to about 70°C is preferable in order to prevent gellation during the reaction. While the reaction time depends on the reaction temperature and other factors, and the reaction is usually completed within a period of time from several hours to 10 odd hours. When solvent is used in the reaction, it is necessary to remove the solvent by means of reduced pressure treatment.

What have been described thus far are mainly the preparing method and the epoxidation of diene compound among the additive compounds usable in the present invention. However, it is also possible to prepare diene compound having carboxyl group and hydroxyl group at both ends of its molecule when the technique to stop the formation reaction of diene compound is selected. This is not only effective, but also is desirable, as a mode of practice of the present invention, to make the compound a higher reactive derivative having double bonds also at both ends of its molecule by producing still more of these end groups. Acrylic acid or methacrylic acid is used in order to derive a double bond into the epoxy group in the present invention and moreover, a derivative having active hydrogen such as hydroxyethyl methacrylate can also be used.

The specific epoxy compound to be employed derived from a conjugated-diene homopolymer and/or copolymer and bonded with an ethylenically unsaturated organic acid is illustrated for example as follows: in case that a butadiene homopolymer or copolymer is employed,

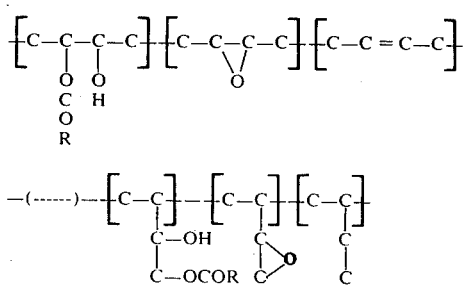

wherein, R means CHX = CHY— group as defined above and (------) means a copolymerized component which may be present or absent. It is understood that the epoxy compound must have at least one component selected from

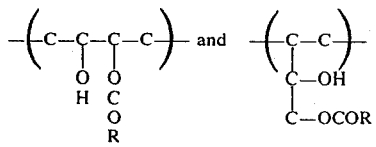

and at least one component selected from

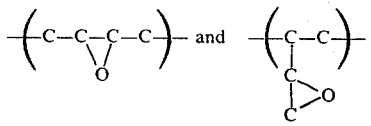

in its molecule.

Typical examples of the application of the improved vinyl chloride resin made by the present invention are artificial leather for a plasticized resin, and for a rigid resin, tube, valves, coating for electric wire, oil resistant material and the like with thermal resistance.

The preferred radiation to be employed includes electron beam, $\beta$-rays, X-rays, $\gamma$-rays, $\alpha$-rays and the like. The irradiation dose is generally about $10^3 - 10^8$ rad and the dose rate is about $10^3 - 10^9$ rad/hour.

The derivative of diene polymer for addition used in the present invention is applied in the quantity of about $0.5 - 100$ parts, preferably about $2 - 50$ parts, to 100 weight parts of vinyl chloride resin.

The present invention will be further explained in detail hereinafter by illustrating some examples. The word "parts" used in the examples means weight parts. Although plasticizer is used in the examples shown below, for the sake of molding, it will be self-evident to those skilled in the art that the present invention, of course, can be applied to a rigid resin in which plasticizer is not used.

EXAMPLE 1

Polybutadiene, with the number average molecular weight of 770, 78.1% of 1,2-bond, 21.0% of 1,4-trans bond and 0.9% of 1,4-cis bond, was prepared by hydrolysis of the liquid polymerized mixture formed by the addition of butadiene to the mixed system of tetrahydrofuran, in which naphthalene was dissolved, with sodium dispersoid. A mixture comprising 50 parts of the above polybutadiene, 50 parts of toluene, 35 parts of glacial acetic acid and 16 parts of strong acid ion exchange resin with the grain size of 30 – 40 mesh, was kept at 60°C with stirring, and 40 parts of 31% hydrogen peroxide aqueous solution was dropped into the mixture over a period of 60 minutes, then it was stirred at 60°C for 180 minutes. The mixture was cooled to room temperature and aqueous solution was separated from the mixture after the ion exchange resin was removed by filtration. Residual product in toluene solution was washed with water and dehydrated with sodium sulfate anhydride. Then, after the solvent was removed, 50.8 parts of colorless and viscose epoxy compound was obtained. Furthermore, 100 parts of the epoxy compound, 22.1 parts of acrylic acid and 0.2 parts of diethylbenzyl ammonium chloride were charged in a reactor. The mixture was allowed to react at 60°C for 3 hours, then the desired product for additive use was obtained.

The resulting product and the epoxy compound as intermediate raw material, prepared as mentioned above, were blended with polyvinyl chloride and others as shown below.

| Components | Example No. 1 | Ex. for Comparison No. 1 | Ex. for Comparison No. 2 |
| --- | --- | --- | --- |
| Polyvinyl chloride (Polymerization degree: 100 Product of Japanese Geon, 103EP) | 100 parts | 100 parts | 100 parts |
| dioctyl phthalate | 50 parts | 50 parts | 50 parts |
| dibasic phosphite | 10 parts | 10 parts | 10 parts |
| titanium dioxide | 10 parts | 10 parts | 10 parts |
| above mentioned final product | 10 parts | 0 | 0 |
| above mentioned epoxy compound | 0 | 10 parts | 0 |

The above compositions were kneaded in a roll kneader by the usual method and plate-like test pieces about 1 mm thick were fabricated by press molding.

These test pieces were irradiated by an electron beam with the intensity of 5 or 10 M rad. in atmospheric air at room temperature, by means of an electron beam accelerator with the capability of two million eV. The irradiated test pieces were cut to make fine strips with 1 mm wide and soluble component was extracted for 7 hours using a Socksley extractor by immersing about 1 g of the strips in tetrahydrofuran (THF). The fractions of unsoluble component of six such samples are tabulated in Table 1. Corrected values are given in the table, in which the fractions of unsoluble component of unirradiated samples were taken from experimental values respectively.

Table 1

| Specimen | Example No. 1 | | Example for Comparison No. 1 | | Example for Comparison No. 2 | |
| --- | --- | --- | --- | --- | --- | --- |
| Radiation Dose (Mrad) | 5 | 10 | 5 | 10 | 5 | 10 |
| Fraction of Unsoluble Component (%) | 42 | 87 | 0 | 8 | 0 | 0 |

As shown in Table 1, the effect of addition of the compound by the present invention is evident. That is, polyvinyl chloride to which the compound by the present invention is added clearly shows the effect of crosslinking with the low dose of radiation, comparing to that to which epoxy compound, without addition of acrylic acid, is added or to that without any additives.

EXAMPLE 2

Butadiene-styrene block copolymer, with the number average molecular weight of 970, 20.8% of styrene units, 79.2% of butadiene units, 83.4% of 1,2-bond in polybutadiene structure, 15.2% of 1,4-trans bond and 1.4% of 1,4-cis bond, was prepared by adding 80 parts of butadiene and 20 parts of styrene to a mixed system of 1,2-dimethoxy ethane, wherein biphenyl was dissolved, with sodium dispersoid. 50 parts of the above copolymer was epoxidized in a similar way to Example 1. 100 parts of the epoxidized compound, 26.5 parts of methacrylic acid, 0.2 parts of diethylamine hydrochlorate and 0.2 parts of hydroquinone monomethylether were charged in a reactor and allowed to react at 65°C for 3.5 hours, then the final compound for additive use was obtained.

The final compound and the epoxidized compound without addition of metacrylic acid were blended respectively with polyvinyl chloride and others as shown below.

| Components | Example No. 2 | Example for Comparison No. 3 |
|---|---|---|
| Polyvinyl chloride (Polymerization degree: 100, Product of Japanese Geon, 103EP) | 100 parts | 100 parts |
| Dioctyl phthalate | 50 parts | 50 parts |
| Dibasic phosphite | 10 parts | 10 parts |
| Titanium dioxide | 10 parts | 10 parts |
| Above mentioned final product | 10 parts | 0 |
| Above mentioned epoxy compound | 0 | 10 parts |

Each of the above compositions was kneaded in a roll kneader by the usual method and plate-like test pieces about 1 mm thick were fabricated respectively by press molding.

These test pieces were irradiated by an electron beam with the intensity of 5 or 10 M rad. in atmospheric air at room temperature, by means of an electron beam accelerator with the capability of 2,000,000 eV. The irradiated test pieces were cut to make fine strips 1 mm wide and soluble component was extracted for 7 hours using a Socksley extractor by immersing about 1 g of the strips in tetrahydrofuran (THF). Thus, the fractions of unsoluble component of four samples are tabulated in Table 2. Corrected values are given in the table, in which the fractions of unsoluble component of unirradiated samples were taken from experimental values respectively.

Table 2

| Specimen | Example No. 2 | | Example for Comparison No. 3 | |
|---|---|---|---|---|
| Radiation Dose (Mrad) | 5 | 10 | 5 | 10 |
| Fraction of Unsoluble Component, % | 37 | 79 | 0 | 5 |

As shown in Table 2, the effect of addition of the compound made by the present invention is evident.

What we claim is:

1. A method of crosslinking a vinyl chloride resin having a polymerization degree of from about 200 to about 5,000 and selected from the group consisting of polyvinyl chloride and a vinyl chloride copolymer consisting essentially of at least 50% by weight of vinyl chloride and no more than 50% by weight of at least one copolymerizable monomer having an ethylenically unsaturated double bond in its molecule comprising incorporating about 0.5 to about 100 parts by weight, per 100 parts by weight of said vinyl chloride resin, of a specific epoxy compound into said vinyl chloride resin and irradiating the mixture thus obtained with an ionizing radiation at a dose rate of from about $10^3$ to $10^9$ rad/hour for a total dose of from about $10^3$ to about $10^8$ rad, wherein said specific epoxy compound is prepared by epoxidizing a homopolymer or copolymer of butadiene, said copolymer containing at least 50 weight % of butadiene, and reacting the epoxidized homopolymer or copolymer with an organic unsaturated acid having ethylenically unsaturated double bond in a carbon atom adjacent to a carbon atom of the carbonyl group in its molecule thus forming a specific epoxy compound with an epoxy portion and an adduct portion resulting from the addition reaction of the epoxy portion of the compound and said unsaturated organic acid and further wherein the specific epoxy compound is bonded with said unsaturated organic acid in a ratio of from about 0.1 to about 0.9 mole of acid per mole of epoxy group in said epoxy compound.

2. The method of claim 1 wherein said vinyl chloride resin is incorporated in an amount of from about 2 to about 50 parts by weight.

3. The method of claim 1 wherein said vinyl chloride resin has a polymerization degree of from about 400 to about 3000.

4. The method of claim 3 wherein said vinyl chloride resin is incorporated in an amount of from about 2 to about 50 parts by weight.

5. The method of claim 1 wherein the number average molecular weight of said butadiene homopolymer or copolymer is no greater than about 10,000.

6. A crosslinked vinyl chloride resin prepared by the method of claim 1.

* * * * *